(12) United States Patent
Kuwahara et al.

(10) Patent No.: US 7,690,825 B2
(45) Date of Patent: Apr. 6, 2010

(54) VEHICLE LAMP

(75) Inventors: Sigeru Kuwahara, Shizuoka (JP); Shouichirou Yokoi, Shizuoka (JP); Tsutomu Takiguchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 42 days.

(21) Appl. No.: 11/937,142

(22) Filed: Nov. 8, 2007

(65) Prior Publication Data

US 2008/0112177 A1 May 15, 2008

(30) Foreign Application Priority Data

Nov. 13, 2006 (JP) ............... 2006-306789

(51) Int. Cl.
*F21V 19/02* (2006.01)
*F21V 21/14* (2006.01)

(52) U.S. Cl. ............... 362/530; 362/272; 362/287; 362/421; 362/426; 362/428; 362/507; 362/508; 362/528; 362/531; 362/532; 362/539

(58) Field of Classification Search ............... 362/269, 362/271–272, 285, 287, 418–419, 421, 426–428, 362/507–508, 523, 525, 528–532, 538–539
See application file for complete search history.

(56) References Cited

U.S. PATENT DOCUMENTS 7,008,092 B2 * 3/2006 Tanaka et al. ............... 362/539

| | | | |
|---|---|---|---|
| 2004/0057240 A1 | 3/2004 | Baba et al. | |
| 2004/0057243 A1 | 3/2004 | Takii et al. | |
| 2005/0141234 A1* | 6/2005 | Tajima et al. | 362/524 |
| 2005/0213339 A1 | 9/2005 | Takiguchi et al. | |
| 2005/0237759 A1 | 10/2005 | Natchoo | |

FOREIGN PATENT DOCUMENTS

| | | |
|---|---|---|
| DE | 10131098 A1 | 1/2003 |
| DE | 10217191 A1 | 10/2003 |
| EP | 1342618 A2 | 9/2003 |
| EP | 1591313 A1 | 11/2005 |
| JP | 2004-106769 | 4/2004 |
| JP | 2004-227933 | 8/2004 |

* cited by examiner

*Primary Examiner*—Jason Moon Han
(74) *Attorney, Agent, or Firm*—Fish & Richardson P.C.

(57) ABSTRACT

A vehicle lamp includes a lamp unit, a bracket which supports the lamp unit such that the lamp unit is swivelable in right and left directions, a lamp body which supports the bracket such that the bracket is tiltable in the right and left directions and in up and down directions with respect to the lamp body, an actuator which is supported by the bracket and swivels the lamp unit, a rotating shaft member which is supported by the bracket, and a joint member which is coupled to the actuator. The lamp unit includes a light source, a reflector, a shade, a projection lens, a rotating shaft attaching portion to which the rotating shaft member is attached, and a joint attaching portion to which the joint member is attached.

8 Claims, 5 Drawing Sheets

VEHICLE LAMP

CROSS-REFERENCE TO RELATED APPLICATION(S)

The present application claims priority from Japanese Patent Application No. 2006-306789 filed on Nov. 13, 2006, the entire content of which is incorporated herein by reference.

TECHNICAL FIELD

The present disclosure relates to a vehicle lamp having a lamp unit.

BACKGROUND

Some vehicle lamps, such as vehicle headlamps, have a structure that allows an irradiating direction to be changed while the vehicle is operating.

For example, in some vehicle lamps, an irradiating direction can be adjusted in right-and-left directions while the vehicle is operating (see, e.g., JP 2004-227933 A). Thus, when turning right or left, or when traveling along a winding road, light can be forwardly irradiated in advance in the direction the vehicle is to be turned, thereby enhancing traveling safety.

A lamp unit of the vehicle lamp can be formed with a shaft, which swivelably supports the lamp unit on a support member, and a joint portion, which couples the lamp unit to a driving device operable to swivel the lamp unit. In other words, the lamp unit needs to be specially designed so that it can be swivelably supported on the support member and coupled to the driving device. Therefore, a lamp unit for a vehicle lamp which does not have a function of changing an irradiating direction while the vehicle is traveling cannot be used in a vehicle lamp which has the function of changing an irradiating direction while the vehicle is traveling. Likewise, a lamp unit for the vehicle lamp which has the function of changing an irradiating direction while the vehicle is traveling cannot be used in a vehicle lamp which does not have the function of changing an irradiating direction while the vehicle is traveling. Thus, dedicated lamp units have been required for the respective types of vehicle lamps.

SUMMARY

The disclosure relates to a lamp unit which is adapted to both a vehicle lamp which can change an irradiating direction while the vehicle is traveling and a vehicle lamp which cannot change an irradiating direction while the vehicle is traveling.

Various aspects of the invention are set forth in the claims.

According to one aspect of the invention, a vehicle lamp includes a lamp unit, a bracket which supports the lamp unit such that the lamp unit is swivelable in right and left directions, a lamp body which supports the bracket such that the bracket is tiltable in the right and left directions and in up and down directions with respect to the lamp body, an actuator which is supported by the bracket and swivels the lamp unit, and a rotating shaft member which is supported by the bracket, and a joint member which is coupled to the actuator. The lamp unit includes a light source, a reflector which collects light from the light source toward a desired light collecting region, a shade which is positioned in the light collecting region and defines a shape of an upper edge of a light distribution pattern, a projection lens which forwardly projects the light distribution pattern, a rotating shaft attaching portion to which the rotating shaft member is attached, and a joint attaching portion to which the joint member is attached.

According to another aspect of the invention, a lamp unit of a vehicle lamp includes a light source, a reflector which collects light from the light source toward a desired light collecting region, a shade which is positioned in the light collecting region and defines a shape of an upper edge of a light distribution pattern, a projection lens which forwardly projects the light distribution pattern, a first attaching portion which outwardly protrudes toward an upper side of the shade, and a second attaching portion which outwardly protrudes toward a lower side of the shade.

Other aspects and advantages of the invention will be apparent from the following description, the drawings and the claims.

DETAILED DESCRIPTION

Various examples of implementations of the invention are explained below with reference to the drawings. The following embodiments are intended as examples and are not intended to limit the scope of the invention.

Figure 1:
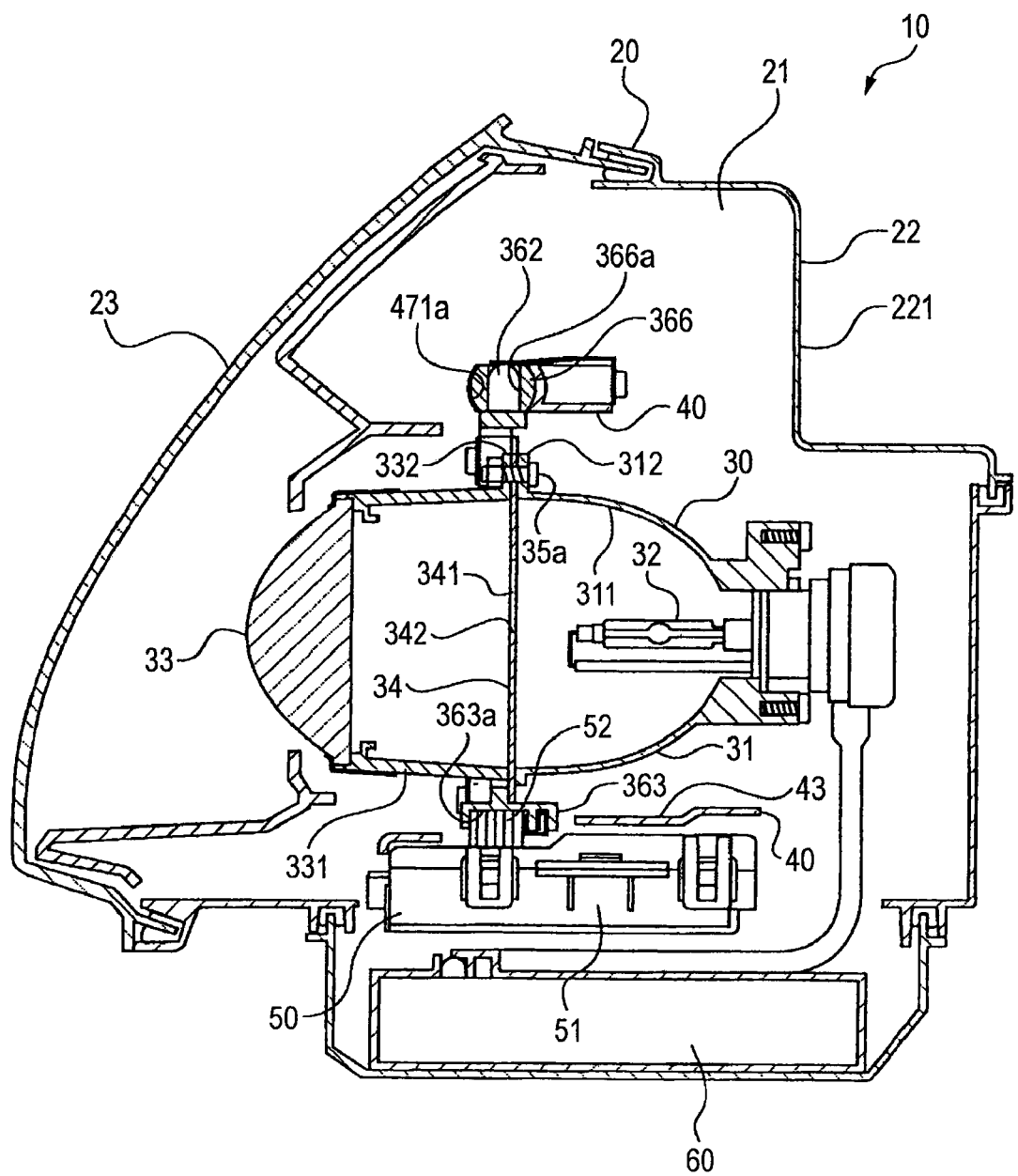
FIG. 1 is a longitudinal sectional view of a vehicle lamp according to an example of the invention.

As shown in FIG. 1, a vehicle headlamp 10 includes a lamp unit 30 arranged inside a housing 20, which forms a lamp chamber 21. The lamp chamber 21 is a substantially sealed space. The lamp unit 30 is arranged so as to be rotatable in up and down directions and in right and left directions. The housing 20 includes a lamp body 22 in the shape of a container, and a transparent cover 23 which covers a front opening of the lamp body 22.

In the illustrated vehicle headlamp 10, the lamp unit 30 is supported by the lamp body 22 via a bracket 40 such that the lamp unit is tiltable in the right and left directions with respect to the lamp body 22.

An actuator 50, which serves as an irradiating direction adjusting device, is supported by the bracket 40. The lamp unit 30 is supported by the bracket 40 such that the lamp unit 30 is swivelable in the right and left directions with respect to the bracket 40, and the lamp unit 30 is coupled to an output portion of the actuator 50.

A discharge lamp lighting circuit 60 also is arranged inside the housing 20, and the lamp unit 30 is turned on via the discharge lamp lighting circuit 60.

Figure 2:
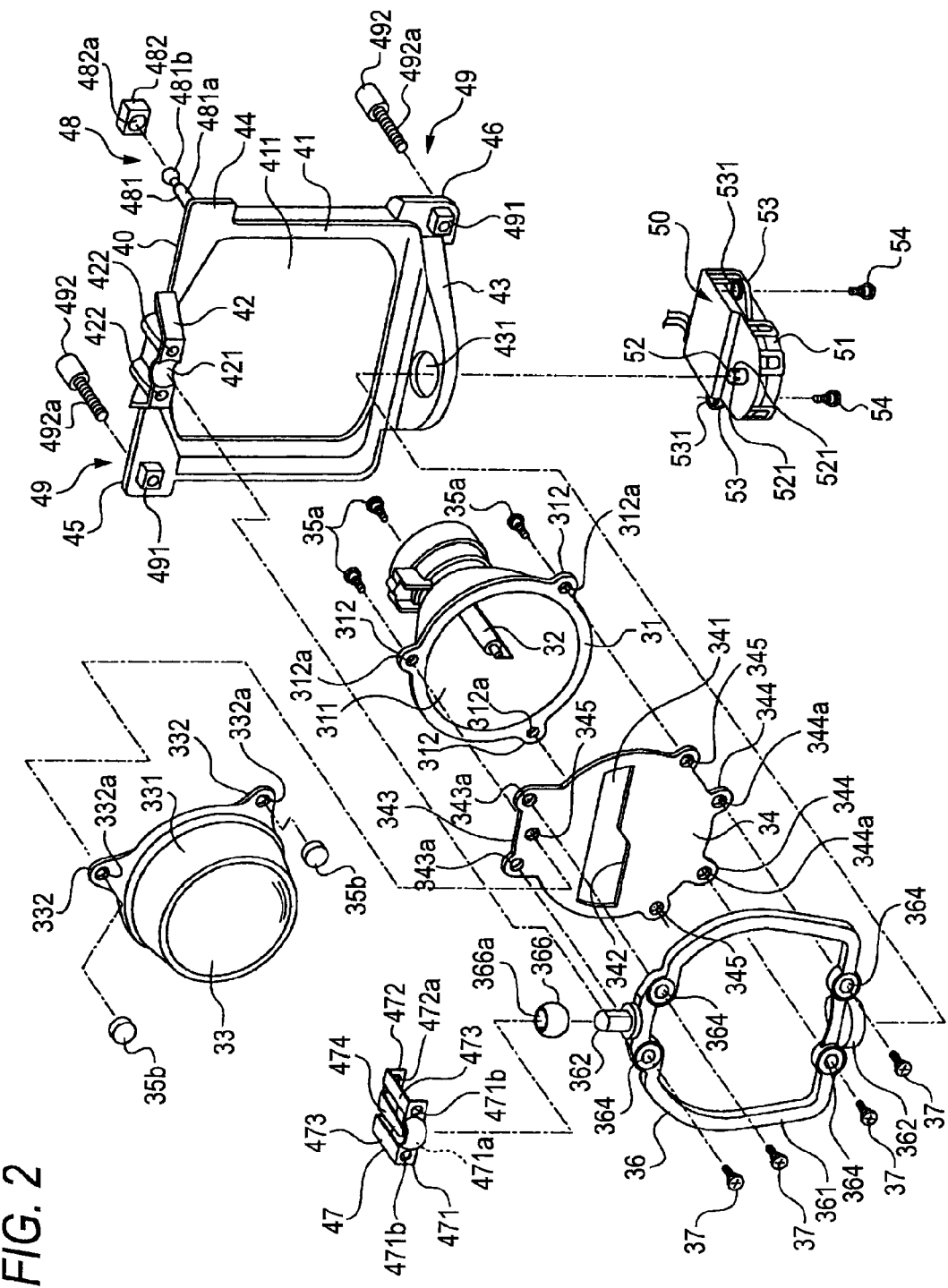
FIG. 2 is an exploded perspective view showing some components of the vehicle lamp.

As shown in FIGS. 1 and 2, the lamp unit 30 includes a reflector 31, a discharge lamp 32 (a light source) held by the reflector 31, a projection lens 33 which forwardly projects light from the discharge lamp 32, and a shade 34 which forms the light from the discharge lamp 32 into a desired pattern.

The reflector 31 has a reflecting surface 311 which collects the light from the discharge lamp 32. For example, the reflecting surface 311 may have a vertical section of an elliptical shape and a horizontal section of a parabolic shape, whereby the light from the discharge lamp 32, which, in this case, is positioned behind a first focal point of the ellipse and also behind a focal point of the parabola, is collected at a second focal point of the ellipse in a state in which the light is slightly spread in a horizontal direction.

The projection lens 33 is a condenser lens having a front surface in a convex spherical shape and a flat rear surface. The projection lens 33 is held on a lens holder 331. The lens holder 331 is attached to a front end portion of the reflector 31 such that a rear focal point of the projection lens 33 is positioned in a light collecting region where the light from the discharge lamp 32 is collected. The lens holder 331 has three attaching pieces 332 protruding outwardly. Each of the attaching pieces 332 is formed with an inserting hole 332a. The reflector 31 also has three attaching pieces 312 protruding outwardly on a front end of the reflector 31. Each of the attaching pieces 312 is formed with an inserting hole 312a. Attaching screws 35a are inserted through the respective inserting holes 312a of the reflector 31 from a rear side thereof, and are then inserted through the respective inserting holes 332a of the lens holder 331. Nuts 35b are screwed on to the respective attaching screws 35a at portions protruding forwardly from the attaching pieces 332. In this way, the projection lens 33 is supported by the reflector 31 through the lens holder 331.

The shade 34 is held between the reflector 31 and the lens holder 331. The shade 34 has the shape of a plate and is slightly larger than an open surface of the front end of the reflector 31. The shade 34 is formed with a light transmitting hole 341 at a central part in a vertical direction thereof. The light transmitting hole 341 is long in a horizontal direction. A lower side edge 342 of the light transmitting hole 341 serves as a cutoff limiting edge. A rotating shaft attaching portion 343 protrudes from an upper end of the shade 34. Screw holes 343a are formed on respective side end portions of the rotating shaft attaching portion 343. Further, joint attaching portions 344 protrude from a lower end of the shade 34, and screw holes 344a are formed on the respective joint attaching portions 344. Moreover, the circumferential edge portion of the shade 34 is formed with two fixing holes 345 separated in right and left directions at a lower end portion thereof, and one fixing hole 345 at a center of an upper end portion thereof.

When fixing the reflector 31 to the lens holder 331, the shade 34 is positioned between the reflector 31 and the lens holder 331. The attaching screws 35a inserted through the inserting holes 312a of the reflector 31 first are inserted through the fixing holes 345 of the shade 34, and then are inserted through the inserting holes 332a of the lens holder 331. When the shade 34 is fixed between the reflector 31 and the lens holder 331, the rotating shaft attaching portion 343 protrudes upward from between upper ends of the reflector 31 and the lens holder 331, while the joint attaching portions 344 separately protrude from between lower ends of the reflector 31 and the lens holder 331.

When the shade 34 is fixed between the reflector 31 and the lens holder 331, the cutoff limiting edge 342 of the shade 34 is positioned at the rear focal point of the projection lens 33 or in the vicinity thereof (in the light collecting region or in the vicinity thereof).

Therefore, when the discharge lamp 32 is turned on, the light is reflected by the reflecting surface 311 of the reflector 31 and is directed toward the vicinity of the cutoff limiting edge 342 of the shade 34. A lower part of the light collected in the light collecting region is shielded by the shade 34, and the other part of the light is inverted and forwardly projected by the projection lens 33. As a result, a beam in a pattern having a cutoff line on an upper edge thereof is forwardly projected. The cutoff line is formed by the cutoff limiting edge 342 of the shade 34.

Because the shade 34, the rotating shaft attaching portion 343 and the joint attaching portions 344 are formed in a one-piece structure, the rotating shaft attaching portion 343 and the joint attaching portion 344 are reliably positioned with respect to the shade 34. Accordingly, even if a positional relationship between the shade 34 (a light distribution regulating edge) and the reflecting surface 331 of the reflector 31 is varied, the positional relationship with the light distribution regulating edge and an optical axis will be stable. Therefore, the rotating shaft attaching portion 343 and the joint attaching portions 344 can be disposed at regular positions in a relationship with the optical axis. Moreover, because the shade 34 is placed between the light source and the projection lens 33, the shade 34 easily can be arranged in the vicinity of a position of a center of gravity of the lamp unit 30. When the shade is arranged at the position of the center of gravity of the lamp unit 30, the rotating axis of the lamp unit 30 can be aligned with the position of the center of gravity of the lamp unit 30.

Figure 3:
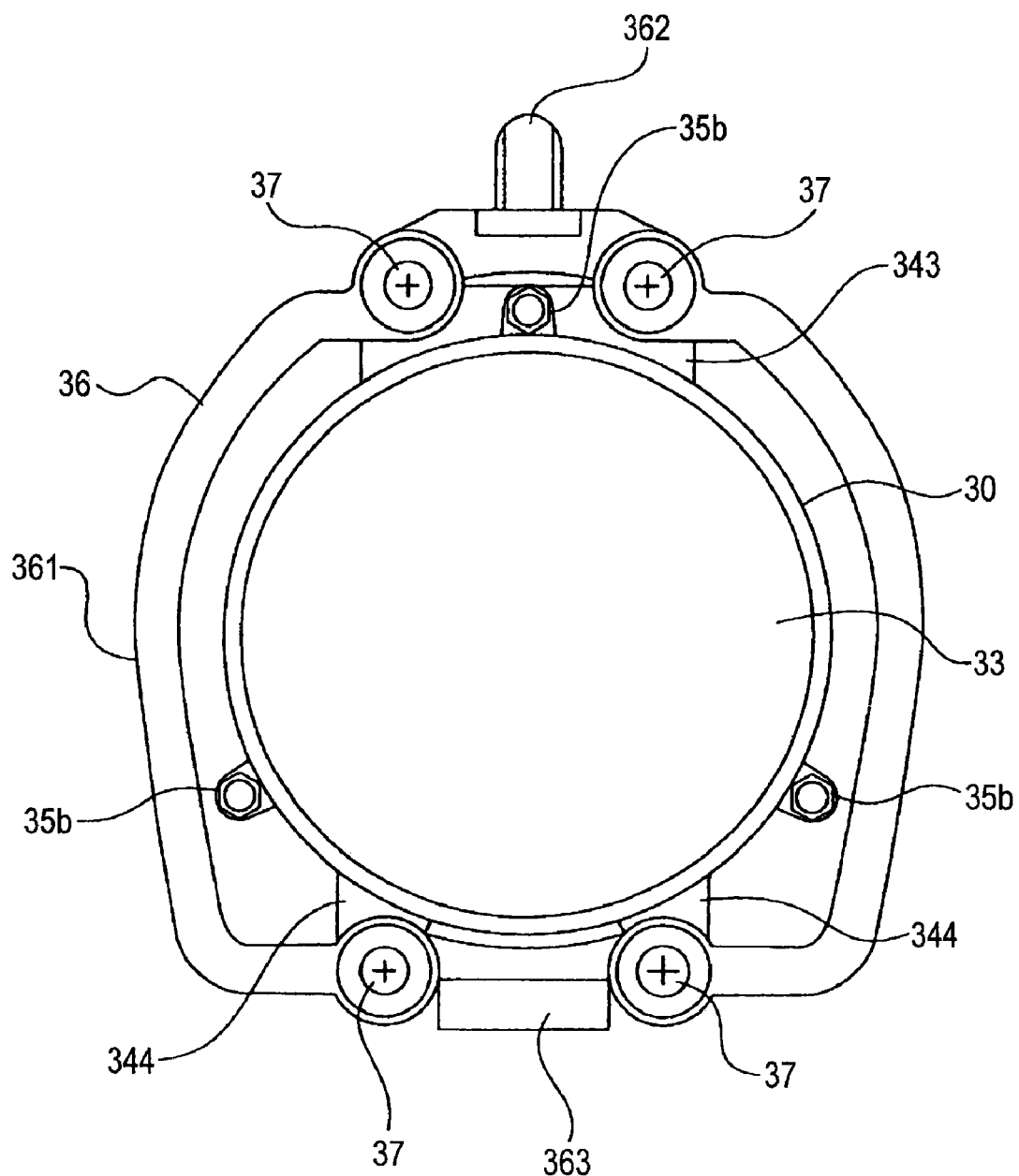
FIG. 3 is a front view showing a frame member attached to a lamp unit.

A swivel frame 36 is attached to the lamp unit 30 having the structure described above. As shown in FIGS. 2 and 3, the swivel frame 36 has a frame portion 361 (a frame member) which surrounds the lamp unit 30 in a plane orthogonal to the optical axis. A rotating shaft member 362 in the shape of a shaft is protruded upward from an upper end of the frame portion 361. A joint member 363 is formed on a lower end of the frame portion 361. Two inserting holes 364, which are spaced away from each other in the right and left directions, are formed respectively at a portion near the upper end and at a portion close to the lower end of the frame portion 361. Because the frame portion 361, the rotating shaft member 362 and the joint member 363 are formed in a one-piece structure, a positional shift between the rotating shaft member 363 and the joint member 363 can be prevented so that precision in assembly of the lamp unit 30 can be enhanced. Furthermore, workability of the assembly can be improved so that productivity can be enhanced. In this respect, it is possible to contribute to a reduction in a cost of the vehicle lamp 10.

Figure 4:
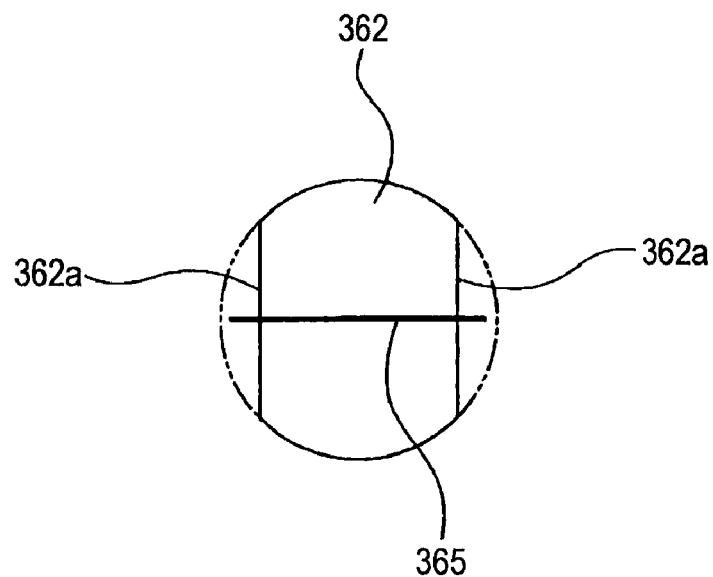
FIG. 4 is an enlarged plan view showing a rotating shaft member.

Respective portions of the swivel frame 36, i.e., the frame portion 361, the rotating shaft member 362 and the joint member 363, are integrally molded from a resin material. A parting line of metal molds is formed in a plane orthogonal to the optical axis. As shown in FIG. 4, the rotating shaft member 362 has a shape such that both right and left side portions of a circular shape (i.e., portions shown in a two-dotted chain line) are cut away when seen in a plan view, and the parting line 365 is formed so as to extend in the right and left directions. Accordingly, the parting line 365 is formed on flat side surfaces 362a of the rotating shaft member 362.

Figure 5:
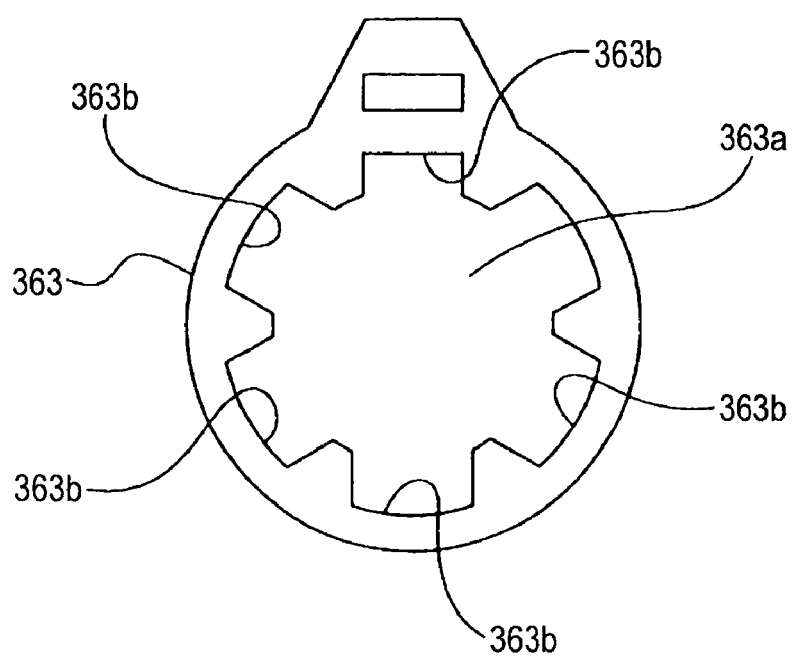
FIG. 5 is an enlarged bottom view showing a joint member.

The joint member 363 has the shape of a relatively thick disk. As shown in FIG. 5, the joint member 363 has a circular coupling concave portion 363a which is opened on a lower surface thereof. Engagement grooves 363b extending in an axial direction are formed on an inner peripheral surface of the coupling concave portion 363a.

Attaching screws 37 inserted into the inserting holes 364 of the swivel frame 36 from a front side thereof are fastened into the screw holes 343a of the rotating shaft attaching portion 343 and screw holes 344a of the joint attaching portions 344 respectively, whereby the swivel frame 36 is fixed to the lamp unit 30. As a result, the rotating shaft member 362 protrudes upwardly from the upper end of the lamp unit 30, and the joint member 363 is provided on the lower end of the lamp unit 30.

As shown in FIGS. 1 and 2, the bracket 40 includes a main portion 411 in the shape of a shallow bowl opened on its front side. The main portion 411 is formed with a large opening 411. An upper support piece 42 protrudes forward from an upper end of the main portion 41, and a lower support piece 43 protrudes forward from a lower end of the main portion 41. Coupling pieces 44, 45, 46 protrude from three corner portions of the main portion 41.

A support concave surface 421, which faces the forward direction, is provided on a front end face of the upper support piece 42 of the bracket 40. The support concave surface 421 is formed to be a concave spherical surface. Screw holes 422 also are formed on the front end face of the upper support piece 42 on respective sides of the support concave surface 421. In addition, screw holes (not shown) are formed on a rear side surface of the upper support piece 42.

A holding plate 47 is attached to the upper support piece 42. The holding plate 47 is formed from a material having spring elasticity, for example, a plate spring material. The holding plate 47 includes a front surface portion 471, a rear surface portion 472, coupling pieces 473 coupling the front surface portion 471 and the rear surface portion 472 at both sides of each of upper edges, and a pressing piece 474 protrudes forward from a center of the upper edge of the rear surface portion 472 in the right and left directions, which are formed in a one-piece structure. A support concave surface 471a, which faces the rearward direction, is formed at the central part of the front surface portion 471. The support concave surface 471a is formed as a concave spherical surface. Inserting holes 471b are formed on respective side portions of the front surface portion 471. Inserting holes 472a also are formed on respective side portions of the rear surface portion 472.

A circular inserting hole 431 is formed through a central part of the lower support piece 43 of the bracket 40.

The bracket 40 is supported on the lamp body 22 such that the bracket 40 is tiltable in the up and down directions as well as in the right and left directions. More specifically, the bracket 40 is coupled to a rear wall 221 of the lamp body 22 such that the coupling piece 44 is coupled to the rear wall 221 via a rotating fulcrum portion 48 and such that the two coupling pieces 45, 46 are coupled to via interval adjusting portions 49, respectively.

The rotating fulcrum portion 48 includes a fulcrum shaft 481 supported on the coupling piece 44, and a ball receiving member 482 supported on the rear wall 221 of the lamp body 22. The fulcrum shaft 481 includes a shaft portion 481a having a front end fixed to the coupling piece 44, and a sphere 481b formed on a rear end of the shaft portion. The sphere 481b is fitted in a spherical concave portion 482a formed on the ball receiving member 482. The sphere 481b is rotatable in the spherical concave portion 482a so that the shaft portion 481a can be tilted.

Each of the interval adjusting portions 49 includes a nut member 491 supported on the coupling piece 45 (or 46), and an adjusting shaft 492 which is rotatably supported on the rear wall 221 of the lamp body 22. A screw shaft portion 492a of the adjusting shaft 492 is screwed into the nut member 491.

For example, when the adjusting shaft 492 is rotated with respect to the nut member 491 supported on the coupling piece 45, the screw shaft portion 492a is screwed into or back from the nut member 491 depending on a direction of the rotation. In this way, the coupling piece 45 is moved forward or rearward, whereby an interval between the coupling piece 45 and the rear wall 221 of the lamp body 22 can be increased or reduced. As a result, the bracket 40 is rotated in the right and left directions around a rotating axis which is a line connecting the coupling piece 46 and the coupling portion of the sphere 481b of the rotating fulcrum portion 48 and the spherical concave portion 482a. When the adjusting shaft 492 is rotated with respect to the nut member 491 supported on the coupling piece 46, the screw shaft portion 492a is screwed into or back from the nut member 491 depending on the direction of the rotation. In this way, the coupling piece 46 is moved forward or rearward, whereby an interval between the coupling piece 46 and the rear wall 221 of the lamp body 22 can be increased or reduced. As a result, the bracket 40 is rotated in the up and down directions around a rotating axis which is a line connecting the coupling piece 45 and the coupling portion of the sphere 481b of the rotating fulcrum portion 48 and the spherical concave portion 482a.

The upper end portion of the lamp unit 30 is supported by the bracket 40 in the following manner. An automatic aligning metal 366 (a support member) is fitted on the outside of the rotating shaft member 362. The automatic aligning metal 366 has almost a spherical external shape. A central hole 366a is formed through a center of the automatic aligning metal 344 in the vertical direction. The rotating shaft member 362 is slidably inserted into the central hole 366a of the automatic aligning metal 366. Because the parting line 365 is formed on the flat cut-away portions 362a of the rotating shaft member 362, the parting line 365 and an inner peripheral surface of the central hole 366a of the automatic aligning metal 366 are prevented from rubbing against each other. Accordingly, the parting line 365 does not impede the rotation of the automatic aligning metal 366 with respect to the rotating shaft member 362.

The automatic aligning metal 366, through which the rotating shaft member 362 is inserted, is first attached to the support concave surface 421 of the upper support piece 42 of the bracket 40, and then, the support concave surface 471a of the holding plate 47 is attached to the automatic aligning metal 366 from the front side. Further, attaching screws (not shown) are inserted through the inserting holes 471b of the front surface portion 471 of the holding plate 47 from the front side, and are fastened into the screw holes 422 on the front end of the upper support piece 42. Other attaching screws (not shown) are inserted through the inserting holes 472a of the rear surface portion 472 of the holding plate 47 from the rear side, and are fastened into screw holes (not shown) on the rear end of the upper support piece 42. Consequently, the holding plate 47 is fixed to the upper support piece 42, and the automatic aligning metal 366 is supported by the support concave surface 421 of the upper support piece 42 and the support concave surface 471a of the holding plate 47. The front end portion of the pressing piece 474 of the holding plate 47 downwardly presses the upper end of the rotating shaft member 362. As a result, the upper end of the lamp unit 30 is supported on the bracket 40 so as to be rotatable in the right and left directions.

The actuator 50 includes a case body 51, an output shaft 52 protruding from an upper surface of the case body 5, and a driving mechanism which is accommodated inside the case body 51 and rotates the output shaft 52. Engagement projections 521 extending in an axial direction are provided on an outer circumferential surface of the output shaft 52. Attaching pieces 53 protrude sideward from the case body 51. Attaching screws 54, 54 are inserted through inserting holes 531 of the attaching pieces 53 from below, and are fastened into screw holes (not shown) formed on a lower surface of the lower support piece 43 of the bracket 40, whereby the actuator 50 is attached to the lower surface of the lower support piece 43 of the bracket 40. The output shaft 52 of the actuator 50 is inserted through the inserting hole 431 of the lower support piece 43, and protrudes upward from the lower support piece 43. The output shaft 52 is coupled to the coupling concave portion 363a of the joint member 363 provided on the lamp unit 30. At this time, the engagement projections 521 of the output shaft 52 are engaged with the engagement grooves 363b of the coupling concave portion 363a so that the rotation of the output shaft 52 is transmitted reliably to the joint member 363 and to the lamp unit 30.

In the vehicle headlamp 10 described above, when the output shaft 52 of the actuator 50 is rotated, a rotating force of the output shaft 52 is transmitted to the lamp unit 30 through the joint member 363 so that the lamp unit 30 is swiveled in the right and left directions around a swiveling axis. The swiveling axis is an axis connecting a center of the rotating shaft member 362 and a center of the joint member 363.

The lamp unit 30 described above can also be used in a vehicle lamp which does not have a function to change an irradiating direction in the right and left directions while the vehicle is traveling.

Figure 6:
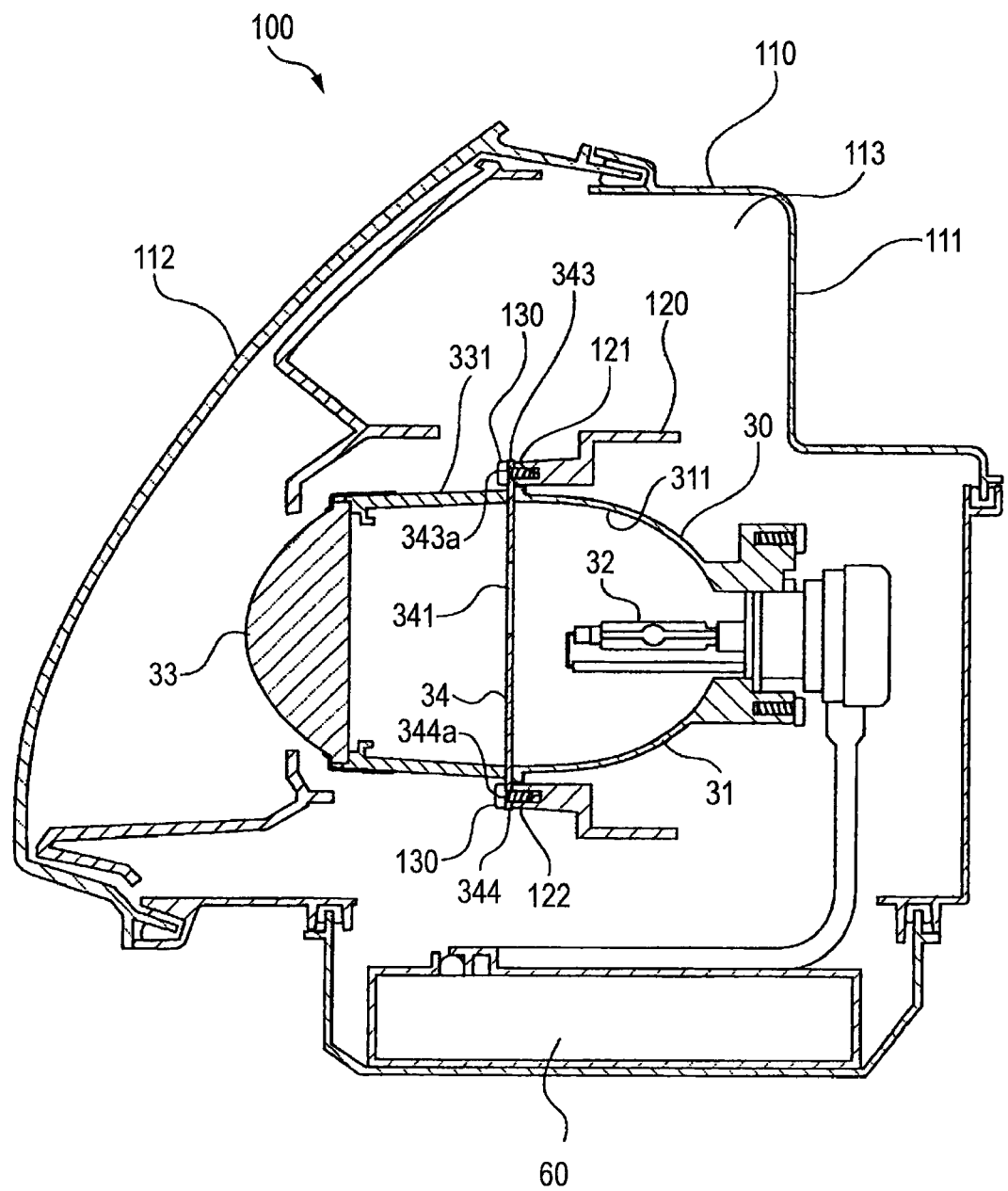
FIG. 6 is a longitudinal sectional view showing a vehicle lamp according to another example of the invention.

FIG. 6 shows an example vehicle lamp 100 which does not have the function of changing an irradiating direction in a the right and left directions while the vehicle is traveling.

The vehicle lamp 100 includes a housing 110 forming a lamp chamber 113. The housing 10 includes a lamp body 111 and a transparent cover 112 which closes a front surface of the lamp body 111. The lamp unit 30 is fixed to a bracket 120 which is arranged inside the lamp chamber 113 such that the bracket is tiltable in the right and left directions and in the up and down directions. Screw holes 121 (only one is shown in the drawing) opened toward a front side are formed on an upper end of the bracket 120, and screw holes 122 (only one is shown in the drawing) opened toward a front side are formed on a lower end of the bracket 120.

Attaching screws 130 (only one is shown in each of upper and lower parts) are inserted through the screw holes 343a (only one is shown in the drawing) of the rotating shaft attaching portion 343 formed on the upper end of the lamp unit 30 and through the screw holes 344a (only one is shown in the drawing) of the joint attaching portions 344 (only one is shown in the drawing) formed on the lower end of the lamp unit 30 respectively, and are fastened into the screw holes 121, 122 of the bracket 120, whereby the lamp unit 30 is fixed to the bracket 120.

According to the examples described above, the same the lamp unit 30 can be used both in a vehicle lamp which does not have the function of changing an irradiating direction while the vehicle is traveling and in a vehicle lamp which has the function of changing an irradiating direction while the vehicle is traveling. Thus, it is possible to contribute to a reduction in cost of the lamp unit 30.

The rotating shaft member 362 and the joint member 363 are formed integrally with the swivel frame 36 in the foregoing examples. However, the rotating shaft member 362 and the upper end portion of the swivel frame 36 where the inserting holes 364 are formed may be formed as one piece, and the joint member 363 and the lower end portion of the swivel frame 36 where the inserting holes 364 are formed may be formed as another separate piece so that the respective pieces can be fixed separately to the lamp unit 30.

Various changes and modification may be made with respect to the foregoing implementations. Accordingly, other implementations are within the scope of the claims.

What is claimed is:

1. A vehicle lamp comprising:
   a lamp unit;
   a bracket which supports the lamp unit such that the lamp unit is swivelable in right and left directions;
   a lamp body which supports the bracket such that the bracket is tiltable in the right and left directions and in up and down directions with respect to the lamp body;
   an actuator which is supported by the bracket and is operable to swivel the lamp unit;
   a rotating shaft member which is rotatably supported by the bracket; and
   a joint member which is coupled to the actuator,
   wherein the lamp unit comprises:
      a light source;
      a reflector to direct light from the light source toward a light collecting region;
      a shade disposed in the light collecting region and which defines a shape of an upper edge of a light distribution pattern;
      a projection lens to project the light distribution pattern forwardly;
      a rotating shaft attaching portion to which the rotating shaft member is attached such that the rotating shaft member is immovable with respect to the rotating shaft attaching portion; and
      a joint attaching portion to which the joint member is attached, wherein the rotating shaft attaching portion and the joint attaching portion are formed on the shade.

2. The vehicle lamp according to claim 1 further comprising a frame member which surrounds the lamp unit in a plane perpendicular to an optical axis, wherein the rotating shaft member, the joint member, and the frame member are formed as a one-piece structure.

3. The vehicle lamp according to claim 2, wherein the rotating shaft member, the joint member and the frame member are integrally molded from a resin material,
   the rotating shaft member is shaped such with right and left side portions of a circle are cut away, and
   a parting line formed along a joining portion of metal molds for the integral molding is formed on the cut away surfaces.

4. The vehicle lamp according to claim 2, wherein the frame member is attached to the rotating shaft attaching portion and the joint attaching portion.

5. The vehicle lamp according to claim 1 further comprising a lens holder which is coupled to a front surface of the reflector and supports the projection lens,
   wherein the shade is held between the reflector and the lens holder and is formed in a shape of a plate having a light transmitting hole through which a part of the light reflected by the reflector passes toward the projection lens while the other part of the light is shielded by the shade, and
   the shade, the rotating shaft attaching portion and the joint attaching portion are formed as a one-piece structure such that the rotating shaft attaching portion and the joint attaching portion protrude outwardly from between the reflector and the lens holder.

6. The vehicle lamp according to claim 1 further comprising a transparent cover which is disposed in front of the lamp unit and is attached to the lamp body.

7. The vehicle lamp according to claim 1 wherein the rotating shaft attaching portion and the joint attaching portion protrude outwardly from the shade.

8. A vehicle lamp comprising:
   a lamp unit;
   a bracket which supports the lamp unit such that the lamp unit is swivelable in right and left directions;
   a lamp body which supports the bracket such that the bracket is tiltable in the right and left directions and in up and down directions with respect to the lamp body;
   an actuator which is supported by the bracket and is operable to swivel the lamp unit;
   a rotating shaft member which is supported by the bracket; and a joint member which is coupled to the actuator;
a frame member which surrounds the lamp unit in a plane perpendicular to an optical axis, wherein the rotating shaft member, the joint member, and the frame member are formed as a one-piece structure;
wherein the lamp unit comprises:
  a light source;
  a reflector to direct light from the light source toward a light collecting region;
  a shade disposed in the light collecting region and which defines a shape of an upper edge of a light distribution pattern;
  a projection lens to project the light distribution pattern forwardly;
  a rotating shaft attaching portion to which the rotating shaft member is attached; and
  a joint attaching portion to which the joint member is attached,
wherein the rotating shaft member, the joint member and the frame member are integrally molded from a resin material,
the rotating shaft member is shaped such with right and left side portions of a circle are cut away, and
a parting line formed along a joining portion of metal molds for the integral molding is formed on the cut away surfaces.

* * * * *